United States Patent
Landis

(10) Patent No.: US 6,878,897 B1
(45) Date of Patent: Apr. 12, 2005

(54) RESISTANCE PROJECTION WELDER ERROR INHIBITOR

(75) Inventor: Tod Michael Landis, Allendale, MI (US)

(73) Assignee: Practical Innovations LLC, Allendale, MI (US)

( * ) Notice: Subject to any disclaimer, the term of this patent is extended or adjusted under 35 U.S.C. 154(b) by 0 days.

(21) Appl. No.: 10/335,712

(22) Filed: Jan. 2, 2003

(51) Int. Cl.[7] .................................................. B23K 9/24
(52) U.S. Cl. ........................................ 219/119; 219/93
(58) Field of Search ............................. 219/119, 117.1, 219/93, 86.41, 109

(56) References Cited

U.S. PATENT DOCUMENTS 6,303,893 B1 * 10/2001 Perks ........................... 219/93
6,355,900 B1 * 3/2002 Sherman .................... 219/117.1
6,576,859 B2 * 6/2003 Cabanaw ..................... 219/119

* cited by examiner

Primary Examiner—Kiley S. Stoner
Assistant Examiner—Len Tran

(57) ABSTRACT

A device is shown for determining if a weld nut is oriented or even present on a work piece before welding is initiated. This device determines the status of the weld nut by gauging the pressure of the air. If the weld nut is correctly oriented, then a predetermined pressure has been obtained and the welding of the nut to the work piece occurs. If an elevated air pressure is read, the device does not send a signal to weld as the weld nut is oriented upside down. If the air pressure is high, or at or nearing the supply pressure, then there is no weld nut present and no weld signal is delivered.

7 Claims, 4 Drawing Sheets

RESISTANCE PROJECTION WELDER ERROR INHIBITOR

BACKGROUND OF THE INVENTION

1. Field of the Invention

The weld nut has a series of projections contacting the metal work piece, for the weld to hold the required amount of force, the orientation of the weld nut must be correct with respect to the material that it is being welded to. When welded in the incorrect orientation, and weld nut will fail prematurely and separate from the material welded to.

2. Background Art

There are many different ways to overcome the condition of preventing the welding of upside down weld nuts. The two sided nut solves the issue very simply as it can not be loaded incorrectly. It has projections on both sides of the nut. It is also more expensive to produce and purchase than conventional weld nuts. This method can allow parts to be welded with no weld nut present.

The use of fiber optics to determine the orientation of the weld nuts is another method, but the system must be calibrated as the electrodes wear. This system measures the height difference of the loaded nut. Another limitation is that when using fiber optics, you can only use one controller per set of electrodes.

By using pressurized air through the upper electrode set to a predetermined flow rate, the U.S. Pat. No. 6,303,893 to Perks found that the weld nut orientation could be determined. This design uses customized electrodes and controls that add to the cost to produce and maintain the system. When the upper electrodes begin to wear, the flow rate changes beyond the set values. Either the electrodes are replaced, or the system must be calibrated to account for the additional wear.

Objects and Advantages

Accordingly, besides the object and advantages of the weld nut orientation detection described in my above patent, several objects and advantages of the present invention are:
a) Prevent the welder from welding if no weld nut is loaded;
b) Maintain a consistent welding process by not requiring calibration during the production operation;
c) Maintain consistent process control by being able to use reconditioned electrodes using the same control settings;
d) One detection device can be used to detect weld nuts on multiple sets of electrodes;
e) Utilizes electrodes that are commonly available;
f) The lower electrode wears less due to the greater surface contact as compared to the upper electrode;
g) When electrodes are replaced the control program needs no modification;
h) Utilizes inexpensive controls by using a programmable switch.

SUMMARY OF THE INVENTION

Many manufacturing processes require the use of weld nuts to hold components together. In order to use these weld nuts, the nuts must be attached to the work piece. This is typically done by welding the weld nuts to the work piece. Weld nuts have projections on one side of the nut to aid welding the nut to the work piece. The opposite side of the weld nut has no projections and is relatively smooth. The weld nut must be properly oriented with the projections adjacent to the work piece it is being welded against to obtain the best weld so that the weld nut and work piece are securely fixed. Orienting the weld nut properly before welding is thus important to manufacturers.

The detector assembly (24) interfaces with the weld controller (not shown) via direct wiring (28). The detector assembly (24) is powered by 110 volt AC. This is converted to 12 volt DC to power the pressure switch (18) and closes the circuit at the weld controller. The detector assembly (24) also has positive pressurized air delivered to it at regulator inlet (42). An air regulator (20) is set within the pressure switch (18) operating range. The electrode base (12) holds a weld nut on a specifically modified locator pin (10). The modification consists of a keyway (26) machined along the pin (10).

The locator pin (10) is retained in a receiver (44) and the weld head (14) is placed on the locator pin (10) and adjacent to the receiver (44), best shown in FIG. 2. The air inlet (36) is attached to the air outlet (40) from the digital pressure switch (18). The air inlet (36) feeds air into the receiver (44) and keyway (26).

The pressurized air is ported through the keyway (26) when the welder is activated, and the electrodes come together affixing the weld nut (not shown) to the work piece.

The detector assembly (24) sends a signal to a power supply relay (22) only if the calibrated pressure leak is made. The pressure switch (18) looks for the proper amount of pressure drop, and sends a signal only if correct. The projection weld nut orientation causes a different pressure drop for each condition. The pressure switch (18) is programmable, and the upper and lower control limits are set per each application on a trial basis.

By using an upper electrode (16) with a recess (32), the locator pin (10) fits into the upper electrode (16) recess (32) when no weld nut is present stopping the flow of air and increasing the air pressure. Since the locator pin (10) is not pushed down, no air is ported, and the signal to allow the weld controller to weld is not given.

When the weld nut (not shown) is loaded incorrectly, the locator pin (10) is pushed down and air is ported at the preset pressure. This air pressure will exceed the values set during the trials noted above, and the signal to the weld controller is not given.

The third condition is for the weld nut (not shown) to be loaded properly. When the weld nut (not shown) is loaded properly, the locator pin (10) is pushed down and allows air to be ported through the keyway (26) at a constant pressure up to the weld nut (not shown). The air passes under the weld nut (not shown) projections at a constant pressure as set during the setup trials noted above. When the air pressure is within the programmed limits of the pressure switch (18), the circuit is completed to the weld controller to allow the weld program to weld the weld nut (not shown) to the work piece.

BRIEF DESCRIPTION OF THE DRAWINGS

In the drawings.

| 10 | Locator Pin | 12 | Electrode Base |
|---|---|---|---|
| 14 | Weld head | 16 | Upper Electrode |
| 18 | Digital Pressure Switch | 20 | Air Regulator |
| 22 | Power Supply Relay | 24 | Detector Assembly |
| 26 | Keyway | 28 | Wiring |
| 30 | Weld head Recess | 32 | Upper Electrode Recess |
|  |  | 36 | Air Inlet |
| 38 | Water Inlet | 40 | Air outlet |

DETAILED DESCRIPTION

Figure 1:
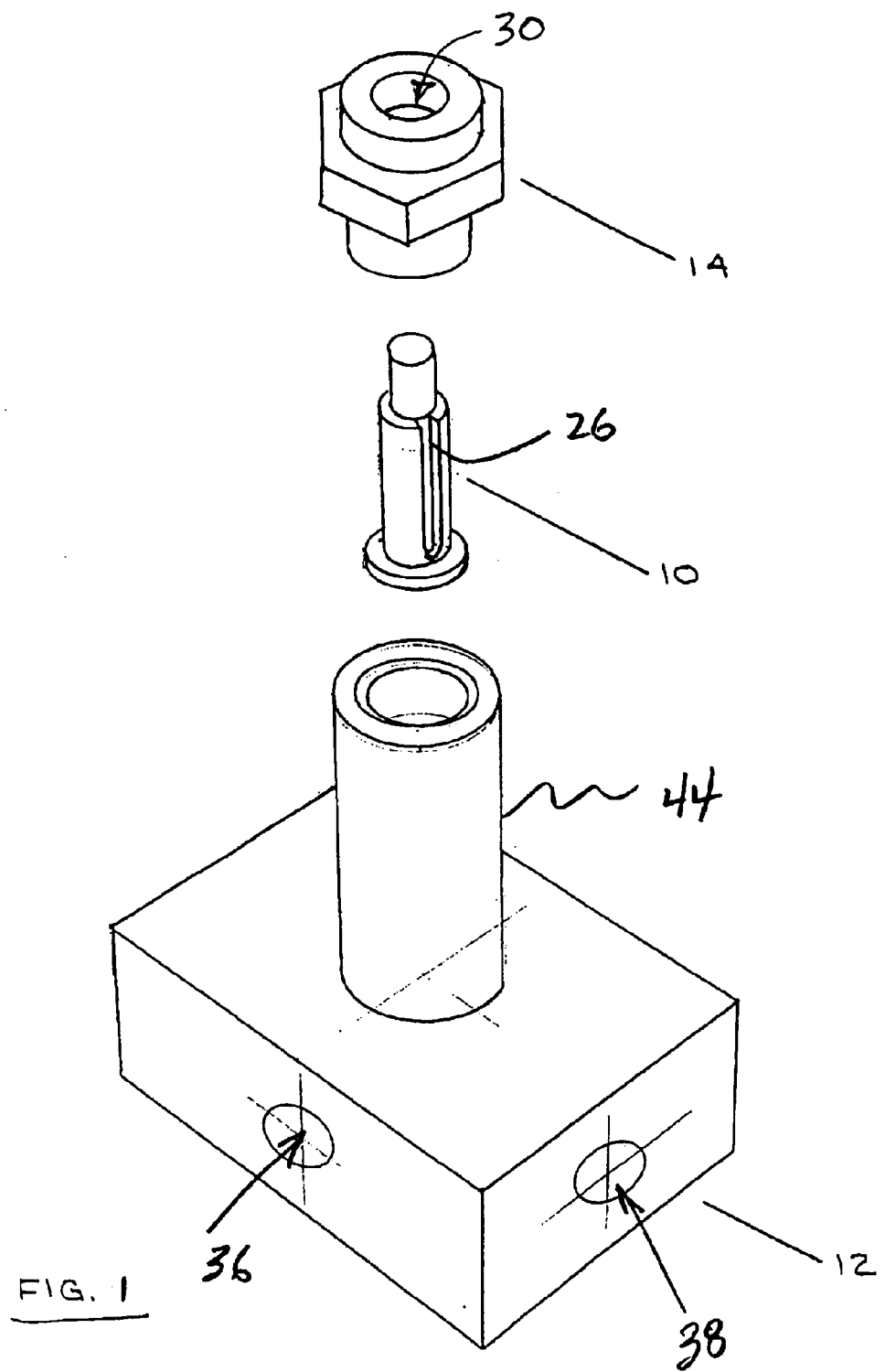
FIG. 1 is a schematic illustration of the locator pin (10), with a groove, or keyway (26) machined into it.

FIG. 1 illustrates a common locator pin (10). The device requires the pin (10) to have a keyway (26) machined into it. This keyway (26) allows air to pass from the bottom of the electrode base (12). Air is only allowed to pass through the keyway (26) when the locator pin (10) is pushed down.

Figure 2:
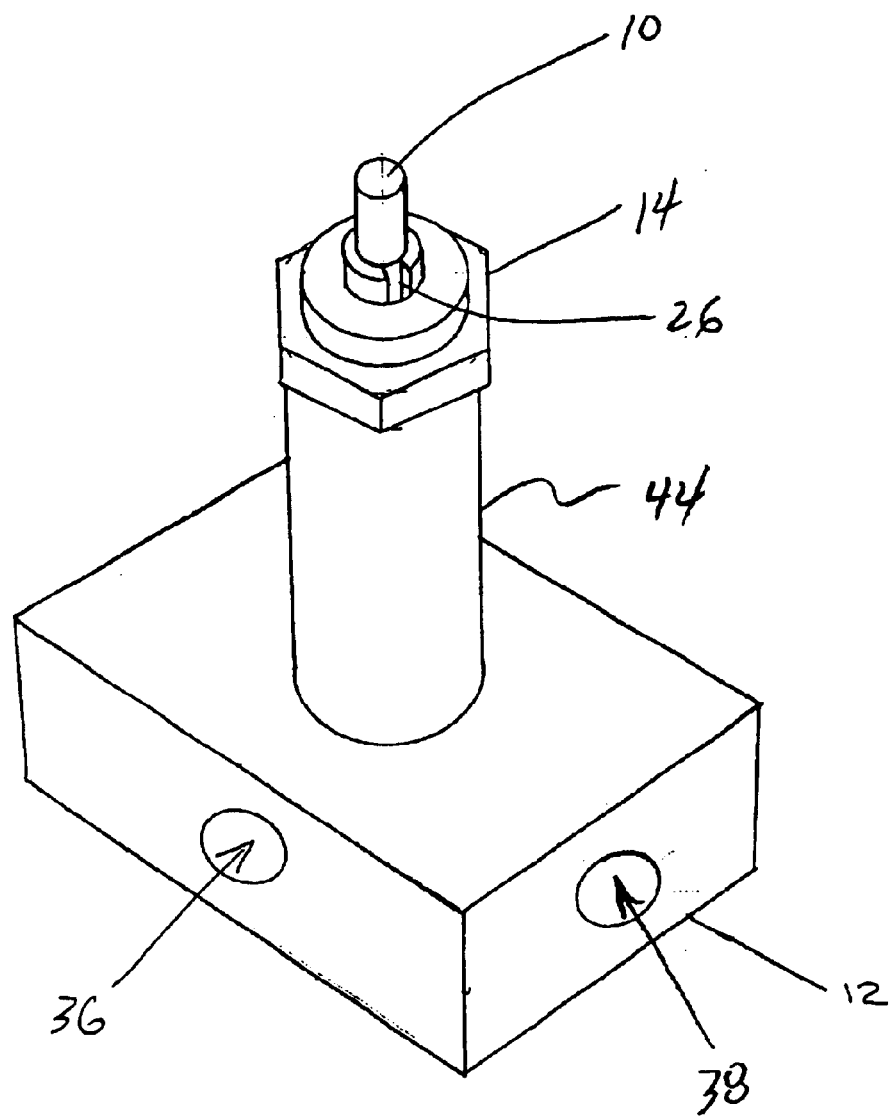
FIG. 2 is an illustration of an electrode base (12). The outside diameter of the locator pin (10) fits the inside diameter of the weld head (14).

FIG. 2 is an illustration of a common electrode base (12). This device uses the spring and spring insulator (not shown) that is shipped with the electrode base (12). The locator pin (10) and the weld head (14) is made to fit each application.

Figure 3:
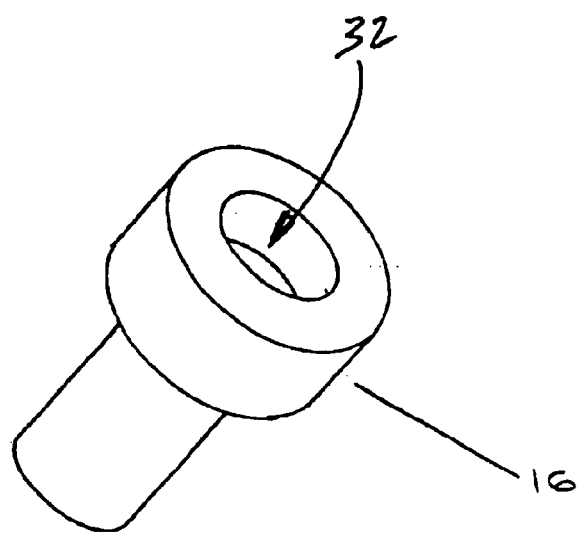
FIG. 3 is an illustration of an upper electrode (16); the electrode (16) inner diameter (32) is larger that the outer diameter of the locator pin (10) at the recess (32) portion.

FIG. 3 is an illustration of a common upper electrode (16). The upper electrode recess (30) inner diameter is larger than the locator pin (10) outer diameter. The locator pin (10) fits into the upper electrode (16) recess (32) when no weld nut is loaded. This allows no air to pass, and no signal to be sent to the weld controller to proceed with the weld operation.

Figure 4:
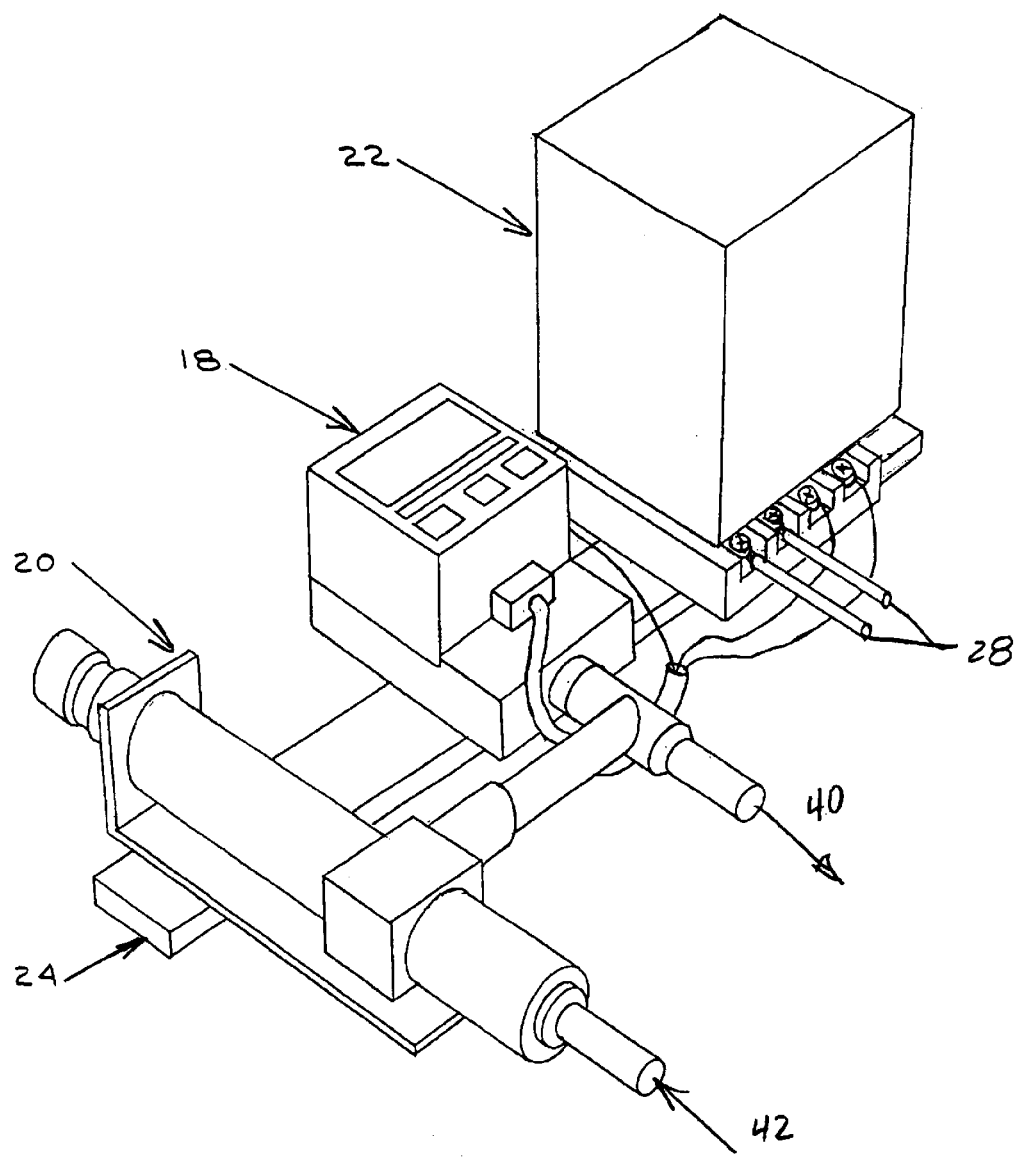
FIG. 4 is an illustration of the detector assembly (24) including the digital pressure switch (18), the air regulator (20), and the power supply relay (22).

FIG. 4 is an illustration of the weld nut detector assembly (24). The components consist of a digital pressure switch (18), the air regulator (20), and the power supply relay (22).

The start sequence to resistance welders is normally made with two wires (28). One of these wires is taken from the welder terminal strip (not shown), to the normally closed relay (22), then wired back to the terminal strip. This is how the stuck down locator pin (10) condition was resolved. Should the pin (10) become stuck down, the signal from the pressure switch stays on, and prevents the start cycle for another weld until the signal is turned off.

The weld nuts (not shown) are first loaded in the incorrect orientation, or upside down condition, and the air pressure reading on the digital pressure switch (18) is recorded. Then the weld nuts (not shown) are loaded in the correct orientation, and the air pressure reading is recorded. These values are manually entered into the digital pressure switch (18) as process control limits.

When the air pressure is within the upper and lower control limits that are programmed into the digital pressure switch (18), the signal is sent to the power supply relay (22). The signal closes the normally open relay. Weld controllers have built in pressure switch connection points. These two points are wired directly to the normally open power supply relay (22) wiring (28).

When properly installed, the weld nut detector assembly (24) inhibits the weld controller from allowing errors within the programmed values entered. This prevents a weak weld made due to the weld nuts (not shown) being manually loaded in the improper orientation.

What is claimed is:

1. A device for welding a weld nut to a work piece, the device comprising:

an upper electrode interconnected to a welder;

a locator pin located in a receiver of an electrode base;

the locator pin inserted into the weld head and the weld head in contact with the receiver of the electrode base;

a keyway located in the locator pin for receiving pressurized air from the electrode base;

an air regulator for supplying and adjusting the pressure of the air to the electrode base;

a digital pressure switch connected to the air regulator and the electrode base for reading the air pressure and comparing to a pre-determined air pressure;

a power supply relay connected to the digital pressure switch for providing a signal to the welder and powering the digital pressure switch; and whereby the insertion of the weld nut and work piece onto the locator pin and between the weld head and upper electrode results in a pressure reading to the digital pressure switch resulting in a response from the welder.

2. The device of claim 1 wherein:

the pressurized air bleeds out between the weld head and the bottom of the nut and the response from the welder is that the weld nut is welded to the work piece.

3. The device of claim 1 wherein:

the pressurized air bleeds out between the weld nut and the upper electrode and the response from the welder is that the weld nut is not welded to the work piece.

4. The device of claim 1 wherein:

the pressure of the air is equal to the supply pressure and the response from the welder is that no welding occurs.

5. A device for welding a weld nut to a work piece, the device comprising:

an electrode base having a receiver for housing a locator pin, a spring and a weld head;

the electrode base having an air inlet connected to a digital pressure switch and the digital pressure switch connected to an air regulator, the air regulator having a regulator inlet for receiving air from an air supply and adjusting the pressure, and the digital pressure switch having an air outlet connected to the electrode base air inlet, the air inlet connected to the receiver and allowing air to pass to a keyway in the pin and vents to atmosphere;

an upper electrode having an upper electrode recess for receiving a portion of the locator pin, the upper electrode connected to the welder; and whereby when the upper electrode is lowered to the weld nut and a pre-determined air pressure is detected by the digital pressure switch, the welder is activated and the weld nut is attached to the work piece.

6. The device of claim 5 wherein:

the air pressure read by the digital pressure switch is higher than the pre-determined pressure and the welder is not activated.

7. A device for welding a weld nut to a work piece, the device comprising:

an electrode base having an air inlet for receiving pressurized air, the electrode base having a receiver for housing a spring, the spring interacting with a locator pin, the locator pin circumscribed by the weld head, the weld head partially inserted into the receiver, a keyway located in the receiver pin, the keyway for receiving and channeling the pressurized air to the weld head from the electrode base;

a digital pressure switch having an air outlet connected to the air inlet of the electrode base, the digital pressure switch powered by a power supply relay, an air regulator having a regulator inlet for receiving pressurized air from an air supply, the pressure regulator connected to the digital pressure switch;

an upper electrode having an upper electrode recess, the upper electrode recess for receiving a portion of the locator pin and the upper electrode connected to the welder; and whereby the work piece and weld nut are placed on the locator pin and the upper electrode is lowered to contact the weld nut, the digital pressure switch reads the air pressure and the power supply relay sends a signal to the welder based on the air pressure.

* * * * *